US012754772B2

(12) United States Patent
Volobuev et al.

(10) Patent No.: US 12,754,772 B2
(45) Date of Patent: Oct. 6, 2026

(54) FINE-GRAINED VIRTUALIZATION RESOURCE PROVISIONING FOR IN-PLACE DATABASE SCALING

(71) Applicant: Amazon Technologies, Inc., Seattle, WA (US)

(72) Inventors: Yuri Volobuev, Walnut Creek, CA (US); Murali Brahmadesam, Bengaluru (IN); Stefano Stefani, Issaquah, WA (US); Daniel Bauman, Vancouver (CA); Alexey Kuznetsov, New Westminster (CA); Krishnamoorthy Rajarathinam, Salem (IN); Balasubramaniam Bodedhala, Chennai (IN); Xiang Peng, Mountain View, CA (US); Dmitriy Setrakyan, San Bruno, CA (US); Pooya Saadatpanah, San Jose, CA (US); Grant A. McAlister, Morro Bay, CA (US); Anthony Paul Hooper, Toronoto (CA); Navaneetha Krishnan Thanka Nadar, Bothell, WA (US); Chayan Biswas, Fermont, CA (US); Tobias Joakim Bertil Ternstrom, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1007 days.

(21) Appl. No.: 17/211,767

(22) Filed: Mar. 24, 2021

(65) Prior Publication Data

US 2022/0164228 A1 May 26, 2022

(30) Foreign Application Priority Data

Nov. 26, 2020 (IN) ............................ 202041051552

(51) Int. Cl.
*G06F 9/50* (2006.01)
*G06F 9/455* (2018.01)
*G06F 16/21* (2019.01)

(52) U.S. Cl.
CPC .......... *G06F 9/505* (2013.01); *G06F 9/45558* (2013.01); *G06F 9/5016* (2013.01);
(Continued)

(58) Field of Classification Search
CPC .. G06F 16/21; G06F 16/2379; G06F 2201/80; G06F 16/217; G06F 16/2282;
(Continued)

(56) References Cited

U.S. PATENT DOCUMENTS 9,086,921 B2 * 7/2015 Weissman ............... G06F 16/00
9,250,943 B2 2/2016 Chen et al.
(Continued)

*Primary Examiner* — Lewis A Bullock, Jr.
*Assistant Examiner* — Kevin X Lu
(74) *Attorney, Agent, or Firm* — S. Scott Foster; Kowert, Hood, Munyon, Rankin & Goetzel, P.C.

(57) ABSTRACT

Fine-grained virtualization provisioning may be performed for in-place database scaling. Computing resource utilization for a database on a host system is obtained for a period of time. The computing resource utilization may be evaluated with respect to a target capacity for the database. If a scaling event is detected based on the evaluation, a modified target capacity may be determined and used to make an adjustment of the computing resources permitted to be used by the database.

20 Claims, 9 Drawing Sheets

(52) U.S. Cl.
CPC .......... *G06F 9/5077* (2013.01); *G06F 16/217* (2019.01); *G06F 2009/4557* (2013.01)

(58) Field of Classification Search
CPC ... G06F 16/27; G06F 9/45558; G06F 11/3409
See application file for complete search history.

(56) References Cited

U.S. PATENT DOCUMENTS

| | | | | |
|---|---|---|---|---|
| 9,858,095 | B2 | 1/2018 | Breitgand et al. | |
| 9,940,228 | B2 | 4/2018 | Corrie | |
| 10,025,718 | B1 * | 7/2018 | Wasiq | G06F 12/0866 |
| 10,474,547 | B2 * | 11/2019 | McAlister | G06F 11/1471 |
| 10,735,281 | B1 * | 8/2020 | Burgin | H04L 67/10 |
| 10,896,198 | B2 * | 1/2021 | Asadi | G06F 16/27 |
| 11,397,711 | B1 * | 7/2022 | Krishnamurthy | G06F 21/31 |
| 2013/0086590 | A1 * | 4/2013 | Morris | G06F 9/5011 718/102 |
| 2013/0290595 | A1 * | 10/2013 | Weissman | G06F 9/5016 711/6 |
| 2014/0173616 | A1 * | 6/2014 | Bird | G06F 9/5083 718/104 |
| 2015/0293945 | A1 * | 10/2015 | Amrhein | G06F 16/278 707/722 |
| 2016/0321588 | A1 * | 11/2016 | Das | G06F 11/3452 |
| 2017/0109245 | A1 * | 4/2017 | Mcalister | G06F 11/1435 |
| 2017/0206499 | A1 * | 7/2017 | Deshpande | G06Q 10/0838 |
| 2018/0074864 | A1 * | 3/2018 | Chen | G06F 9/5016 |
| 2018/0157729 | A1 * | 6/2018 | Lee | H04L 67/1029 |
| 2018/0359162 | A1 * | 12/2018 | Savov | H04L 41/0897 |
| 2019/0102411 | A1 * | 4/2019 | Hung | G06F 16/21 |
| 2020/0210378 | A1 * | 7/2020 | Kuchibhotla | G06F 11/1471 |
| 2020/0285652 | A1 * | 9/2020 | Wang | H04L 67/10 |
| 2020/0341815 | A1 * | 10/2020 | Manchale Sridhar | G06F 9/5061 |
| 2020/0364189 | A1 * | 11/2020 | Lee | G06F 21/64 |
| 2022/0382721 | A1 * | 12/2022 | Muthukrishnan | H04L 67/1001 |
| 2023/0393879 | A1 * | 12/2023 | Olmsted-Thompson | G06F 9/45558 |

* cited by examiner

FINE-GRAINED VIRTUALIZATION RESOURCE PROVISIONING FOR IN-PLACE DATABASE SCALING

BACKGROUND

Commoditization of computer hardware and software components has led to the rise of service providers that provide computational and storage capacity as a service. At least some of these services (e.g., managed services such as managed relational database services) can be difficult to scale, including scaling the processing capacity. Disruption of an application or other process can be a high cost associated with changing capacity to better match workloads, as client applications may be interrupted due to dropped connections (and may not even retry to connect, in some instances). Techniques that can support scaling resources to match workloads therefore are highly desirable.

Figure 1:
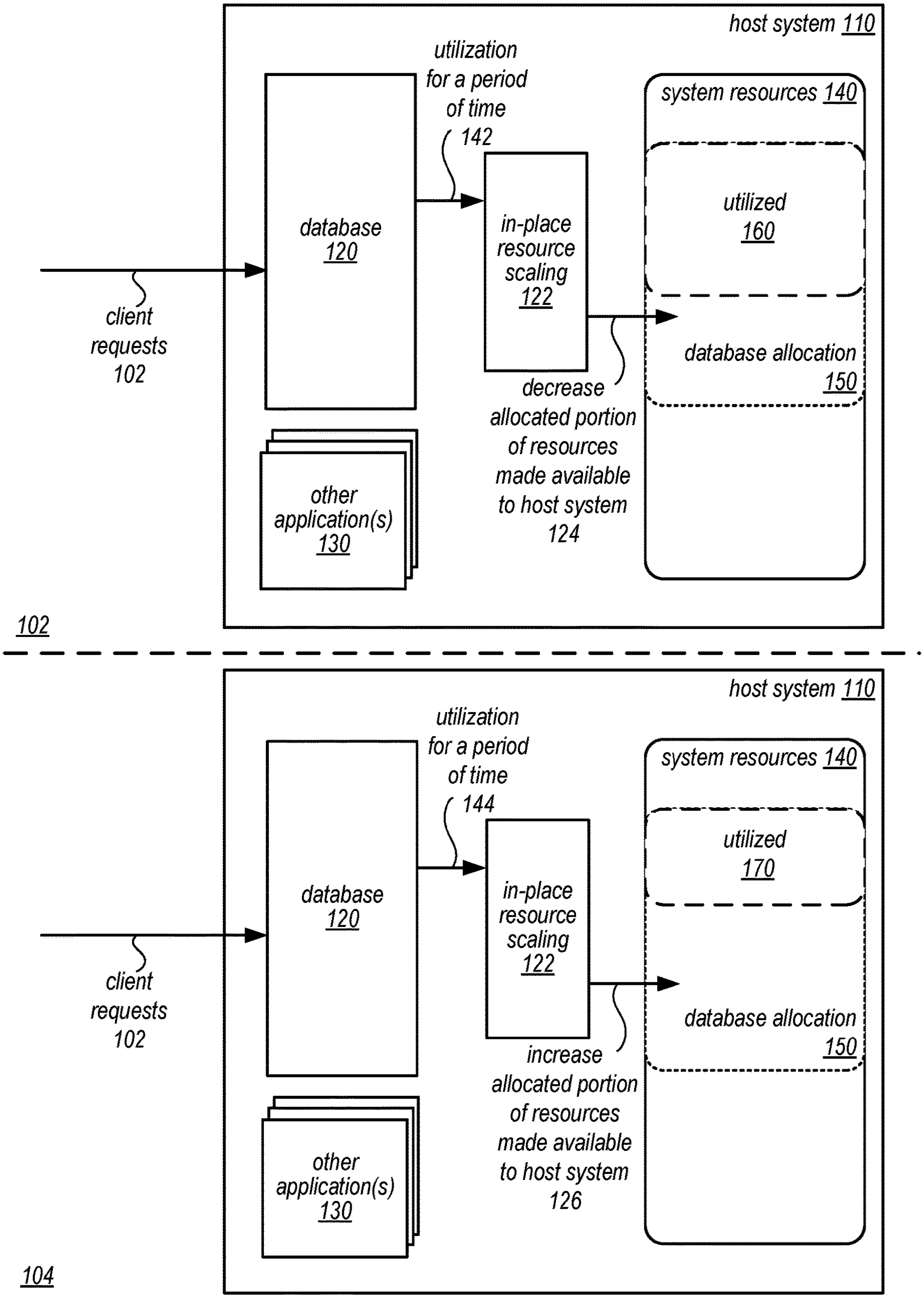
FIG. 1 is a logical block diagram illustrating fine-grained virtualization resource provisioning for in-place database scaling, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for fine-grained virtualization resource provisioning for in-place database scaling are described herein. Database systems, such as those that offer databases as a service as discussed below with regard to FIGS. 2-6B may implement techniques to automatically scale the number of resources allocated for accessing a database in order to prevent changing and unanticipated database workloads that occur after a new database is created (e.g., by users selecting a size and/or number of resources for a database, such as an instance size offered by a provider network). While techniques for scaling the capacity of read-based workloads, such as queries, can rely upon increasing a number of database nodes, instances, or servers (e.g., read replicas) that can read database data to respond to read-based workloads, write-based workloads that rely upon a single writer model in order to ensure consistency may not be able to take advantage of adding resources by adding nodes, instances, or servers.

A write-based workload could be moved to a different system (e.g., moved from one instance, node, or server to another) to increase write capacity, in some scenarios. However, such migration-based scaling techniques can be disruptive (e.g., causing database downtime or degraded performance) and make coarse resource capacity adjustments that may involve large changes in resource capacity that do not necessarily reflect the actual usage that caused the need for scaling. For example, for a database that would need to increase write workload capacity by 10% moving from one database instance to a next size offered database instance with double the memory of the current instance would be disruptive to the database to perform the move and result in memory waste (as much of the increased capacity would not be necessary).

Fine-grained virtualization resource provisioning for in-place database scaling may be implemented in various embodiments to provide for dynamic resource scaling to minimize resource waste and without disruptive migration. In various embodiments, fine-grained virtualization resource provisioning for in-place database scaling may offer many performance improvements. For example, a database instance can acquire additional memory and CPU resources in an entirely non-disruptive way, as no pause or disruption in transaction processing may be caused, and caches can be preserved as they would not have to be warmed in a new location. In another example, fine-grained resource provisioning for in-place database scaling could better account for burst workloads without overprovisioning resources. If a given workload produces a short-lived burst in memory or CPU consumption, this can be satisfied without a permanent scaling operation. Conversely, a sudden spike in memory consumption from a burst workload would not cause an out-of-memory failure. In another example, fine-grained virtualization resource provisioning may provide efficient right-sizing of resources for a database. In this way, a database can consume only as much resource (e.g., measured in units of capacity units, which combine CPU and memory in a fixed ratio, or in terms of raw resource utilization measurements) as a current workload requires, so that a user can accurately obtain the proper amount of resources (preventing resource waste). Fine-grained virtualization resource provisioning may also provide a smaller minimal database footprint so that an idle database should consume significantly less resources allowing for database instances in a multi-tenant scenario to be efficiently placed together on host systems, lower costs, preventing energy and other resource waste, while improve manageability of per-tenant databases.

FIG. 1 is a logical block diagram illustrating fine-grained virtualization resource provisioning for in-place database scaling, according to some embodiments. Host system 110 may be a computing system or device, like computing system 1000 discussed below with regard to FIG. 9. Host system may implement a virtualization technology, like virtual machines, micro virtual machines, or containers, which may support hosting one or multiple database systems as database instances, like database 120 and other instances 130. Database 120 may provide a database system that manages and provides access to a database, handling, for example, various client requests 102 (e.g., queries, inserts, updates, deletions, etc.). Database 120 may implement various types of database systems, in some embodiments, which may include relational database systems or other types of connection-based database systems (e.g., which establish a connection between a client and database 120 in order to perform multiple communications that facilitate database features like transactions).

Host system 110 may provide, as part of the virtualization technology, use of various system resources 140 to database 120 and other instance(s) 130. In some embodiments, virtualization management may allocate different portions, such as allocated portion 150 to database 120. Different types of system resources 40, such as processor, memory, and/or network, among others) may be allocated.

Figure 7:
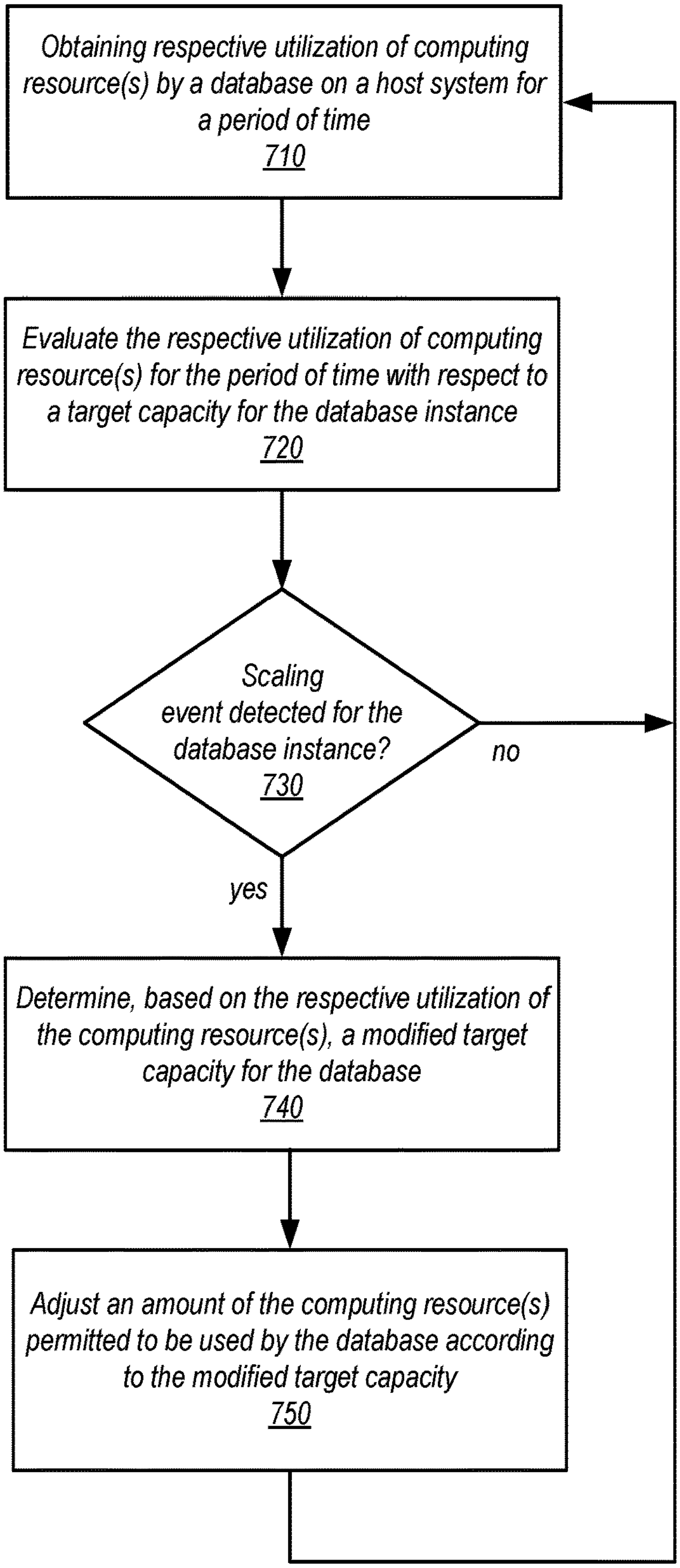
FIG. 7 is a high-level flowchart illustrating various methods and techniques to implement fine-grained virtualization resource provisioning for in-place database scaling, according to some embodiments.

Host system 110 may implement in-place resource scaling 122 as part of virtualization management and/or database 120, which may monitor the utilization of resources and make in-place scaling adjustments using a target capacity determined for database 120, as discussed in detail below with regard to FIGS. 5 and 7-8. Scaling events may be detected for a period of time (e.g., a measurement window of 10 seconds). In-place resource scaling 122 may obtain utilization for a period of time 142 (e.g., as one or more measurements for one or more system resources 140) and evaluate the resource measurements with respect to the target capacity. If scaling event criteria are met (which may prevent burst workloads from triggering scaling), in-place resource scaling 122 may adjust the allocated portion 150 of system resources 140 made available to host system 110 to use for other tasks or other instance(s) 130.

For example, in-place resource scaling 122 may decrease 124 the allocated portion of system resources to database 150 made available to host system 110 (e.g., for other tasks or other instance(s) 130), to provide database 120 with greater utilization 160 of resources 140, as depicted in scene 102 (e.g., a scale up event). As depicted in scene 104, measurements for a different period of time 144 may cause in-place resource scaling 122 to detect a scaling event that increases 126 the allocated portion of resources 150 made available to host system 110, as utilized resources 170 for database 120 have decreased (e.g., a scale down event).

Please note, FIG. 1 is provided as a logical illustration of database instances and hosts, and is not intended to be limiting as to the physical arrangement, size, or number of components, modules, or devices to implement such features.

The specification first describes an example network-based database service that performs fine-grained virtualization resource provisioning for in-place database scaling. Included in the description of the example network-based database service are various aspects of the example network-based database service, such as a database engine head node instance, and a separate storage service. The specification then describes flowcharts of various embodiments of methods for fine-grained virtualization resource provisioning for in-place database scaling. Next, the specification describes an example system that may implement the disclosed techniques. Various examples are provided throughout the specification.

Figure 2:
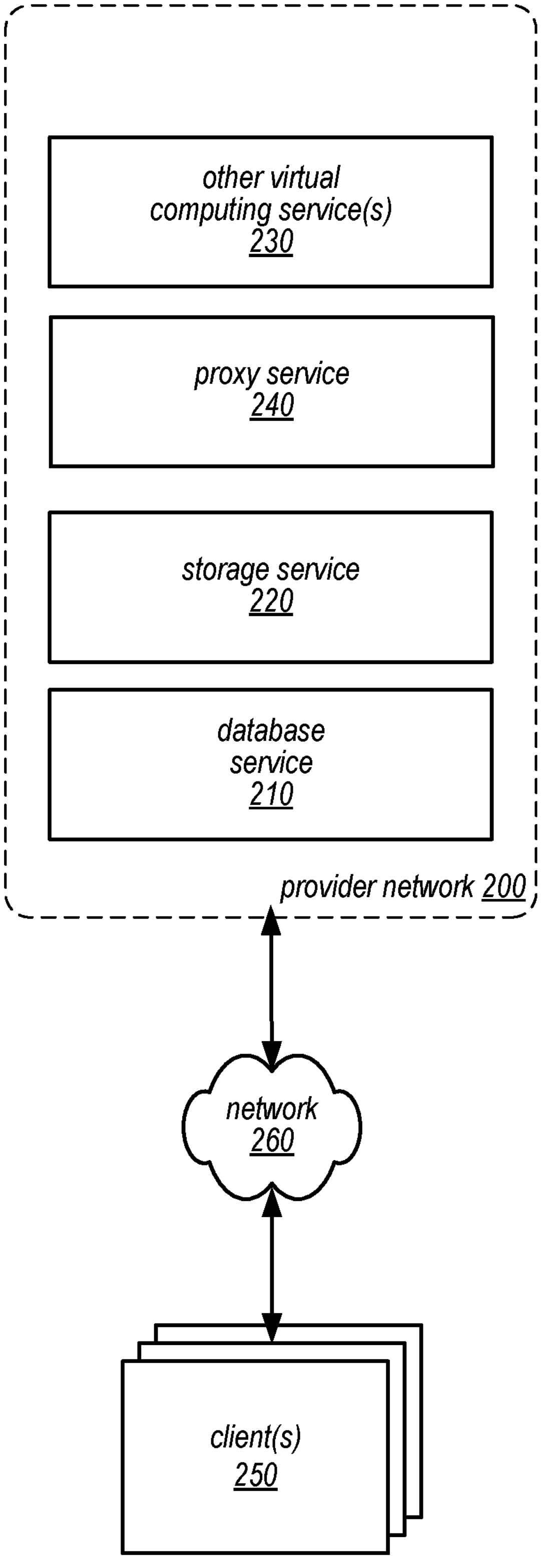
FIG. 2 is a block diagram illustrating a provider network that may implement a database service that implements fine-grained virtualization resource provisioning for in-place database scaling, according to some embodiments.

FIG. 2 is a block diagram illustrating a provider network that may implement a database service that implements fine-grained virtualization resource provisioning for in-place database scaling, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions 200.

In the illustrated embodiment, a number of clients (shown as clients 250 may interact with a provider network 200 via a network 260. Provider network 200 may implement respective instantiations of the same (or different) services, a database services 210, proxy service 240, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, proxy service 240, storage service 220 and/or another virtual computing service 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
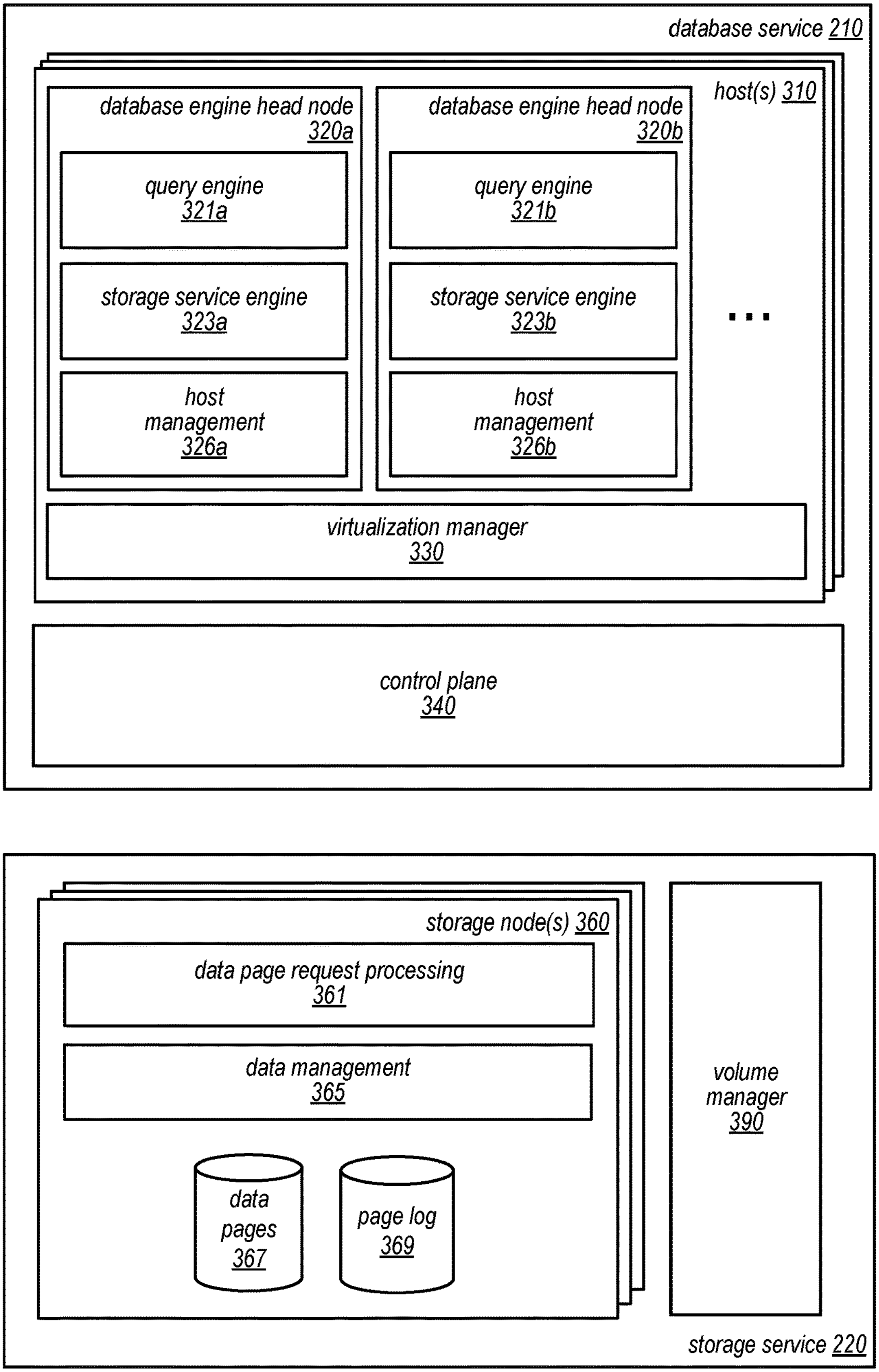
FIG. 3 is a block diagram illustrating various components of a database service and storage service that provides access to a database, according to some embodiments.

FIG. 3 is a block diagram illustrating various components of a database service and storage service that provides access to a database, according to some embodiments. Database service 210 may implement control plane 340 which may manage the creation, provisioning, deletion, or other features of managing a database hosted in database service 210. For example, control plane 340 may monitor the performance of host(s) 310 (e.g., a computing system or device like computing system 1000 discussed below with regard to FIG. 9) for high workloads (e.g., heat) and move or redirect placement of database engine head node instances away from some hosts to avoid overburdening host(s) 310. Control plane 340 may handle various management requests, such as request to create databases, manage databases (e.g., by configuring or modifying performance, such as by enabling a "serverless" or other automated management feature in response to a request which may cause in-place resource scaling to be enabled for that database. Control plane 340 may direct placement of database engine head node instances on host(s) 310 so as to distribute workload across host(s) 310 to avoid failure scenarios, like out-of-memory.

Database service 210 may implement one or more different types of database systems with respective types of query engines for accessing database data as part of the database. For example, database service 210 may implement various types of connection-based (e.g., having established a network connection between a database client and database engine head node 320) database systems which may, for instance, facilitate the performance of various operations that continue over multiple communications between the database client and the connected database engine head node 320. In at least some embodiments, database service 210 may be a relational database service that hosts relational databases on behalf of clients.

Database service 210 may implement a fleet of host(s) 310 which may provide, in various embodiments, a multi-tenant configuration so that different database engine head node instances, such as database engine head node 320*a* and 320*b*, can be hosted on the same host 310, but provide access to different databases on behalf of different clients over different connections. While hosts(s) 310 may be multi-tenant, each database engine head node 320 may be provisioned on host(s) 310 in order to implement in-place scaling (e.g., by overprovisioning resources initially and then scaling-based on workload to right-size the capacity that it is recorded as utilized for an account that owns or is associated with the database that is accessed by the database engine head node 320).

In various embodiments, host(s) 310 may implement a virtualization technology, such as virtual machine based virtualization, wherein database engine head node instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. As discussed in detail below with regard to FIGS. 5-8, virtualization manager 330 may support increasing or decreasing resources made available to host(s) 310 to use for other tasks (including other database engine head node(s) 320) that were allocated to a database engine head node 320 upon creation at host(s) 310.

Database engine head node instance(s) 320 may support various features for accessing a database, such as query engine(s) 321*a* and 321*b*, and storage service engine(s) 323*a* and 323*b* discussed in detail below with regard to FIG. 4, as well as for performing in-place scaling, as discussed in detail below with regard to FIG. 5. Database engine head node instances 320 may implement agents, interfaces, or other controls according to the respective type of virtualization used to collect and facilitate communication of utilization metrics for in-place scaling, among other supported aspects of virtualization, such as host management 326*a* and 326*b*. For example, host management 326 may implement resource utilization measurement, which may capture and/or access utilization information for host(s) 310 to determine which portion of utilization can be attributed to a specific database engine head node 320.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage.

For example, data may be organized in various logical volumes, segments, and pages for storage on one or more storage nodes 360 of storage service 220. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
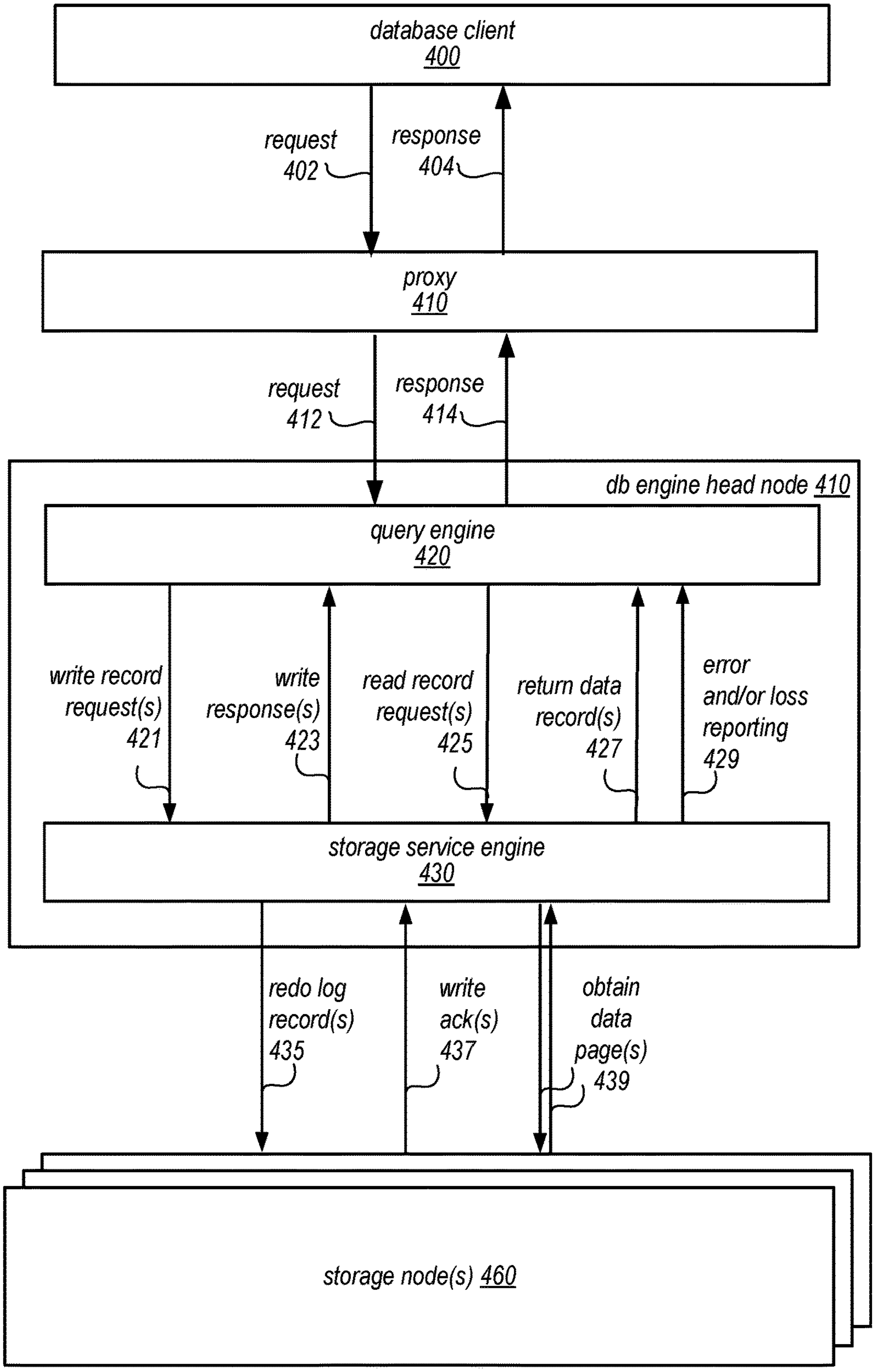
FIG. 4 is a block diagram illustrating various interactions to handle database client requests, according to some embodiments.

FIG. 4 is a block diagram illustrating various interactions to handle database client requests, according to some embodiments. In the example database system implemented as part of database service 210, a database engine head node 410 may be implemented for each database and storage nodes 460 (which may or may not be visible to the clients of the database system and may be similar to storage nodes 360 discussed above with regard to FIG. 3). Clients of a database may access a database engine head node 410 directly in some embodiments (not illustrated)(which may be implemented in or representative of a database instance) via network utilizing various database access protocols (e.g., Java Database Connectivity (JDBC) or Open Database Connectivity (ODBC)). However, storage nodes 460, which may be employed by the database service 210 to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, storage nodes 460 may perform various storage, access, change logging, recovery, log record manipulation, and/or space management operations in a manner that is invisible to clients of a database engine head node 410.

As previously noted, a database engine head node 410 may implements database engines (which may be a query engine 420 and storage service engine 430, in some embodiments. Query engine 420 may receive requests, like request 412, which may include queries or other requests such as updates, deletions, etc., from a proxy 410 connected to a database client 400 which first received the request 402 from the database client 400. Implementing a proxy 410 between database client 400 and database engine head node 410 may allow for database service 210 to change out database engine head nodes (e.g., to scale to larger or smaller database instances in order to increase or decrease hardware capacities for the database or to handle failure without causing an interrupt to database client). However, as discussed above with regard to FIG. 1, such migration based scaling techniques may not be able to respond as quickly to workload demands, so the various in-place scaling techniques discussed above with regard to FIG. 1 and below with regard to FIGS. 5-8 may be performed first before moving a database to another location. Query engine 420 then parses them, optimizes them, and develops a plan to carry out the associated database operation(s). In some embodiments, no proxy 410 may be implemented, but instead database client 400 may establish a connection with and submit requests to query engine 420 directly (as well as receive responses directly).

Query engine 420 may return a response 414 to the request (e.g., results to a query) which proxy 410 may provide as response 404 to database client 400, which may include write acknowledgements, requested data (e.g., records or other results of a query), error messages, and or other responses, as appropriate. As illustrated in this example, database engine head node 410 may also include a storage service engine 430 (or client-side driver), which may route read requests and/or redo log records to various storage nodes 460 within storage service 220, receive write acknowledgements from storage nodes 460, receive requested data pages from storage nodes 460, and/or return data pages, error messages, or other responses to query engine 420 (which may, in turn, return them to a database client).

In this example, query engine 420 or another database system management component implemented at database engine head node 410 (not illustrated) may manage a data page cache, in which data pages that were recently accessed may be temporarily held. Query engine 420 may be responsible for providing transactionality and consistency in the database of which database engine head node 410 is a component. For example, this component may be responsible for ensuring the Atomicity, Consistency, and Isolation properties of the database and the transactions that are directed that the database instance, such as determining a consistent view of the database applicable for a query, applying undo log records to generate prior versions of tuples of a database. Query engine 420 may manage an undo log to track the status of various transactions and roll back any locally cached results of transactions that do not commit.

For example, a request 412 that includes a request to write to a page may be parsed and optimized to generate one or more write record requests 421, which may be sent to storage service engine 430 for subsequent routing to log-structured storage service 450. In this example, storage service engine 430 may generate one or more redo log records 435 corresponding to each write record request 421, and may send them to specific ones of the storage nodes 460 of storage service 220. Storage nodes 460 may return a corresponding write acknowledgement 437 for each redo log record 435 (or batch of redo log records) to database engine head node 410 (specifically to storage service engine 430). Storage service engine 430 may pass these write acknowledgements to query engine 420 (as write responses 423), which may then send corresponding responses (e.g., write acknowledgements) to one or more clients as a response 414.

In another example, a request that is a query may cause data pages to be read and returned to query engine 420 for evaluation. For example, a query could cause one or more read record requests 425, which may be sent to storage service engine 430 for subsequent routing to storage nodes 460. In this example, storage service engine 430 may send these requests to specific ones of the storage nodes 460, and storage nodes 460 may return the requested data pages 439 to database engine head node 410 (specifically to storage service engine 430). Storage service engine 430 may send the returned data pages to query engine 420 as return data records 427, and query engine 420 may then evaluate the content of the data pages in order to determine or generate a result of a query sent as a response 414.

In some embodiments, various error and/or data loss messages 441 may be sent from log-structured storage service 450 to database engine head node 410 (specifically to storage service engine 430). These messages may be passed from storage service engine 430 to query engine 420 as error and/or loss reporting messages 429, and then to one or more clients as a response 414.

In some embodiments, the APIs 435-439 to access storage nodes 460 and the APIs 421-429 of storage service engine 430 may expose the functionality of storage service 220 to database engine head node 410 as if database engine head node 410 were a client of storage service 220. For example, database engine head node 410 (through storage service engine 430) may write redo log records or request data pages through these APIs to perform (or facilitate the performance of) various operations of the database system implemented by the combination of database engine head node 410 and storage nodes 460 (e.g., storage, access, change logging, recovery, and/or space management operations).

Note that in various embodiments, the API calls and responses between database engine head node 410 and storage nodes 460 (e.g., APIs 421-429) and/or the API calls and responses between storage service engine 430 and query engine 420 (e.g., APIs 435-439) in FIG. 4 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C # and Perl to support integration with database engine head node 410 and/or storage nodes 460.

Figure 5:
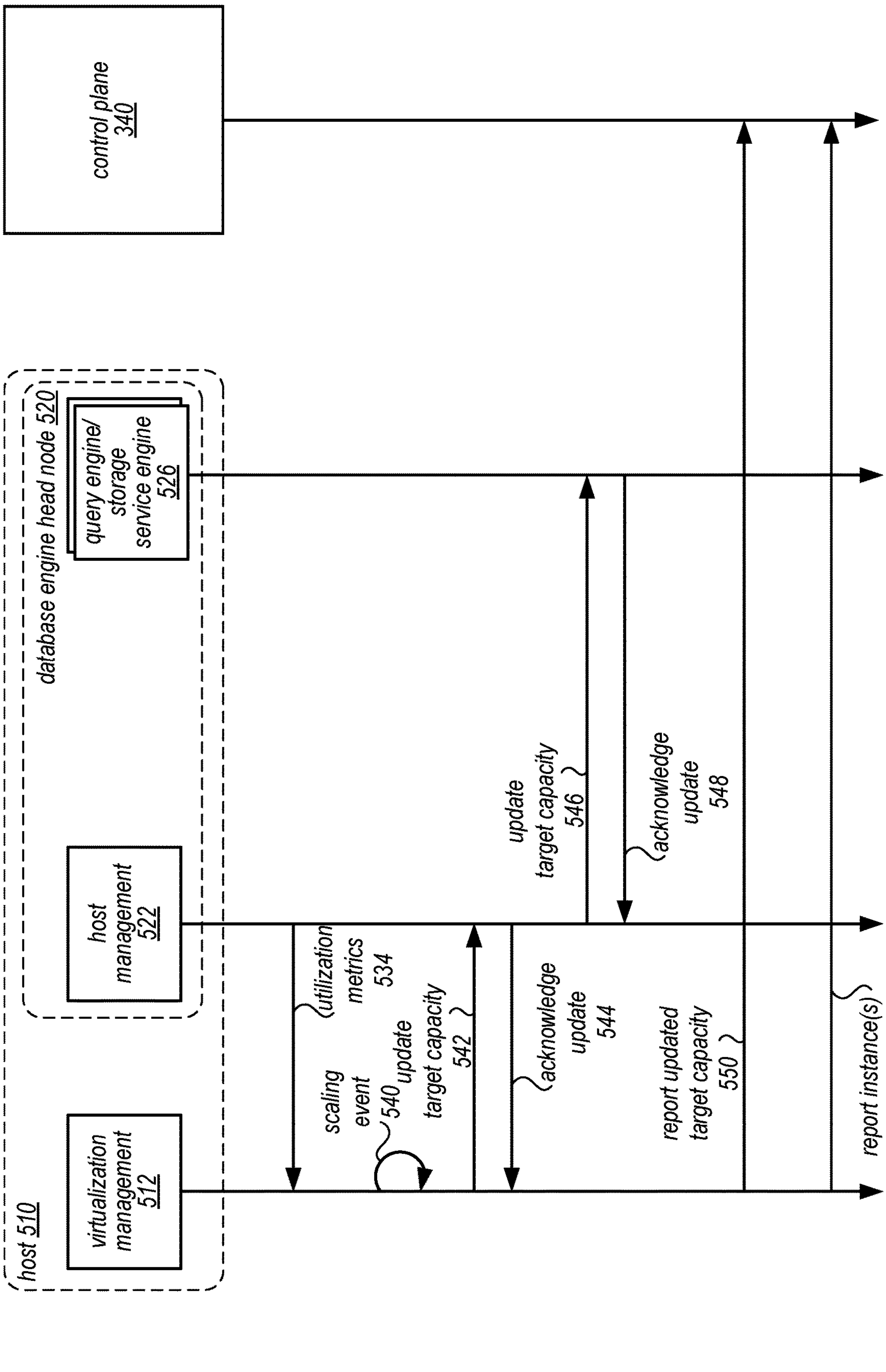
FIG. 5 is a sequence diagram illustrating interactions to detect scaling events and modify target capacity, according to some embodiments.

FIG. 5 is a sequence diagram illustrating interactions to detect scaling events and modify target capacity, according to some embodiments. Host 510, which may be similar to hosts 310 in FIG. 3 and/or host 110 in FIG. 1, may host database engine head node 520, which may perform various aspects of a database system, as discussed above with regard to FIGS. 3 and 4. As host 510 may implement multiple different database instances, virtualization management 512 may coordinate utilization of various hardware and/or software resources at host 510.

Database engine head node 520 may implement various features, such as query engine/storage service engines 526, and host management 522 (similar to host management 326 discussed above). To detect scaling events, host management 522 may collect various different resource usage information at various resolutions or intervals (e.g., every 500 milliseconds), and provide the utilization metrics 534 to virtualization management 512. Virtualization management 512 may monitor utilization metrics to determine whether a scaling event is detected, such as scaling event 540, which may scale up or scale down a target capacity for database engine head node 520, as discussed according to the various techniques below with regard to FIG. 7.

Once detected, virtualization management 512 may determine the update to target capacity (e.g., the utilization of the resource that exceeded or was below the current target capacity) and communicate the update to target capacity, as indicated at 542, to host management 522 (which may acknowledge the update at 655). In turn, host management 522 may update the target capacity 546 to database engine(s) 526 (which may acknowledge the update at 548). In various embodiments, database engine(s) 526 and/or host management 522 may perform the tasks to scale up or down the targeted capacity (e.g., by increasing or decreasing the size of the memory balloon, as discussed in detail below with regard to FIGS. 6A and 6B, adding or removing connections, increasing or decreasing processor time, etc.).

In various embodiments, virtualization management 512 may report the updated target capacity 550 for database engine head node 520 to control plane 340. Similarly, virtualization management 512 may report instance(s) resource usage 560 (e.g., across all instances hosted at host 510) to control plane 340. Control plane 340 may utilize such information, in various ways. For example, changes in target capacity that reach minimum or maximum capacity limits may cause control plane 340 to migrate a database to another host with different resource capacities that will better correspond to the updated target capacity. In some embodiments, control plane 340 may direct, monitor, and/or handle various scenarios based on the reported information (e.g., 350 and/or 360) to protect host 510 from being overutilized which could cause database instances on host 510 to fail for lack of resources, have performance degrade, etc.

For example, a control plane 340 may be responsible for placing new database engine head node instances at one of a fleet of hosts for database service 210. Based on the reported information, an individual host system, like host 510, may reject attempts by control plane 340 to place the new database engine head node (e.g., when the sum of all hosted instances memory usage at the host is above 60% of the host system's memory). For example, in some embodiments, a resource limitation may be lowered to limit the amount of memory that can be consumed at the host system 510 overall. In another example, in-place scaling could be halted. For example, the memory balloon for each database engine head node may be increased and decreased, as discussed below, in order to cause memory to be freed and made available to the host system.

Figure 6A:
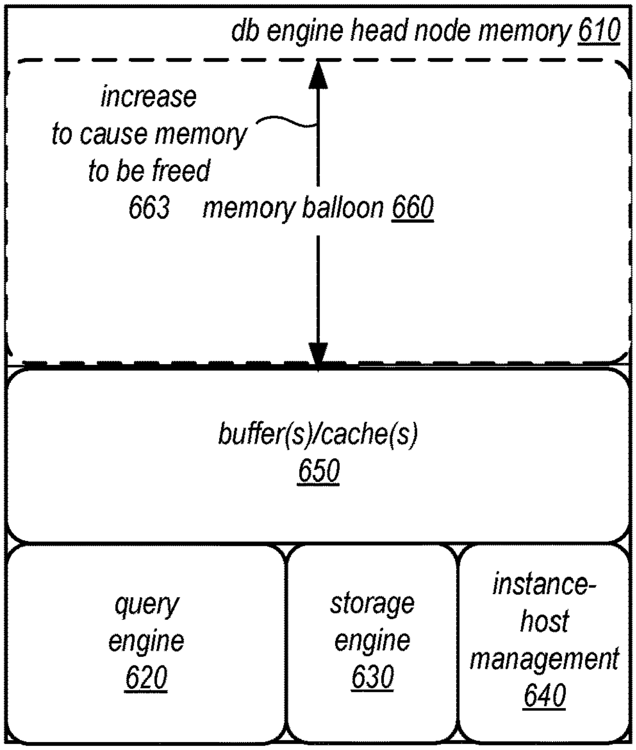
FIGS. 6A-6B are logical block diagrams illustrating changes to a memory balloon for a database instance, according to some embodiments.
Figure 6B:
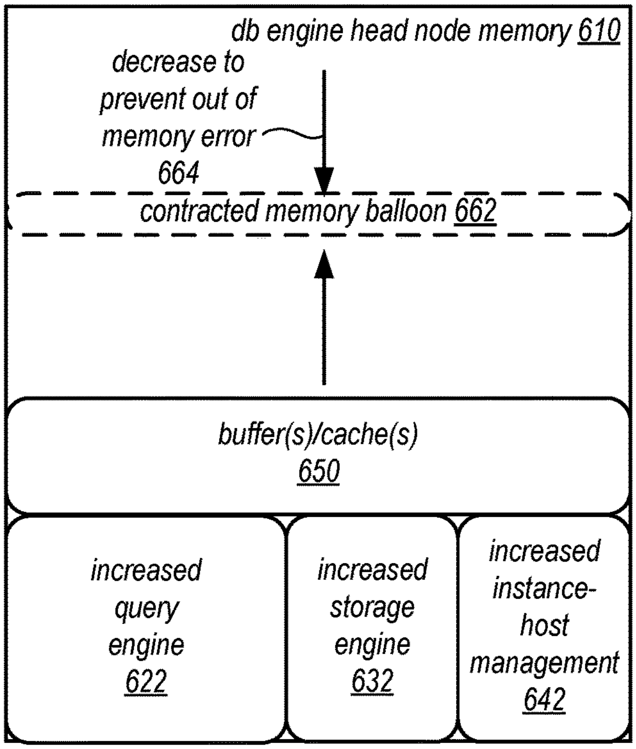

Different techniques for adjusting the resources available to the host system may be implemented. In some embodiments, processor time or other resources, such as network connections be performed by the virtualization management without necessitating a reboot. For example, in at least some embodiments, processing resources may be allowed to instantly scale, when needed, within the specified minimum and maximum processor capacities—even if utilization exceeds the target capacity occurs before the target capacity adjusted upward. Other resources, such as memory, may not be able to be dynamically allocated. Instead, in such scenarios, a feature such as a ballooning driver may be implemented. FIGS. 6A-6B are logical block diagrams illustrating changes to a memory balloon for a database instance, according to some embodiments.

A balloon driver may, in some embodiments, be implemented by a kernel or other component of a database engine head node instance. The balloon driver may allocate unused memory within the address space of memory allocated to the database engine head node into a reserved memory pool (e.g., the memory balloon). Memory placed in the reserved memory pool may not be usable by other processes within the database engine head node instance. This increase in size of the memory balloon may cause a kernel, or other processes for the database engine head node to free memory (as the memory balloon puts pressure on the other processes to free memory so as not to run out of memory). Freeing memory in this way, makes the memory available by virtualization management for the host system to other host system operations and/or other instances hosted at the host system.

For example, in FIG. 6A, database engine head node allocated memory 610, may depict different memory uses, for query engine 620, storage engine 630, host-management 640 and various buffers or caches 650 (e.g., kernel buffer, page cache, etc.). Memory balloon 660 may be increased, as indicated at 663, to cause memory to be freed. If the memory balloon were to stay increased, however, an out of memory (OOM) error or failure could occur that could degrade or kill the database engine head node. Instead, after the memory is freed, the balloon size may be decreased as indicated at 664, as depicted in FIG. 6B. This contracted balloon 662 may prevent an OOM error or failure from occurring.

The database service and storage service discussed in FIGS. 2 through 6B provide examples of a database system that may implement fine-grained virtualization resource provisioning for in-place database scaling. However, various other types of database systems may implement fine-grained virtualization resource provisioning for in-place database scaling. FIG. 7 is a high-level flowchart illustrating various methods and techniques to implement fine-grained virtualization resource provisioning for in-place database scaling, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 710, respective utilization of computing resource(s) by a database on a host system may be obtained for a period of time, in some embodiments. For example, a virtualization manager, utilization measurement component, or other component of the database or host system may obtain the utilization of the database (e.g., CPU usage, memory usage, and/or network usage, such as the number of connections). In some embodiments, the period of time may be related to the number of individual measurements needed to perform an evaluation (e.g., 5 measurements to satisfy a scaling event criteria taken every 1 second may be a 5 second time period or 8 measurements out of 10 measurements above some value to satisfy a scaling event criteria taken every 1 second may be a 10 second time period). In some embodiments, the time period may be treated as a rolling window (e.g., where an oldest measurement falls out of the time period, and thus out of consideration, and a newest measurement comes into the time period).

As indicated at 720, the respective utilization of computing resource(s) for the period of time may be evaluated with respect to a target capacity for the database instance, in some embodiments. A target capacity may be, as discussed above with regard to FIGS. 1 and 5, a resource capacity value targeted for use by the database so that the host system can provide and/or guarantee that capacity (as well track in a user account the size of the database as being the targeted capacity). Changes to target capacity, as made in the various scenarios discussed below, can be tracked or associated with an account, user, or other entity associated with the database in order to appropriately track the changes in size of the database for the account, user, or other entity. In at least some embodiments, an initial target capacity may be specified for a database (e.g., by default value or based on a statistical analysis of similar databases) or by a user request. In some embodiments, the target capacity may be specified as number of capacity units (e.g., a combination of memory and processor capacity according to some fixed ratio).

The respective utilization of the computing resource(s) may be formatted or converted to the capacity units or other measure of the target capacity, in some embodiments, or may be considered individually or as raw measurements (e.g., as the target capacity may also be specified or derived into individual/raw resource utilizations). As indicated at 730, a determination of whether a scaling event is detected based on the evaluation may be made, in some embodiments. For example, scaling event to scale up the target capacity for the database may be detected, in some embodiments, using a moving median of a last N 1-second utilization measurements (e.g., taken at 1 second intervals) being greater than the target capacity. For example, if N=11, then if at least 6 of the last 11 measurements are greater than the target capacity, then a scale-up, scaling event is detected. In another example, a scaling event to scale down the target capacity of the database may occur when a moving median of a last N 1-second utilization measurements (e.g., taken at 1 second intervals) is less than the target capacity. In some embodiments, scaling criteria may differ according to type. For example, a scale up scaling event may occur when any one resource (e.g., memory, processor, network connections, etc.) exceeds the targeted capacity for that database for the median of the last N measurements, whereas a scale down scaling event may only occur when the median of the last N measurements for all resources is below the targeted capacity.

Note that other comparisons and/or criteria may be used in addition to (or instead of) the above example scale up and scale down scaling events. For example, in some embodiments, a predictive machine learning model could be trained to predict resource utilization based on the utilization measurements obtained for the database. In this way a scaling event could be detected based on a predicted utilization for a future time period based on the utilization measurements obtained within the time period (e.g., at 710).

In some embodiments, a user (e.g., via an interface, such as programmatic, command line, and/or GUI, such as management console or interface for a database service) may specify a minimum capacity and/or a maximum capacity.

Scaling events may not, in such embodiments, scale capacity below the minimum capacity or above the maximum capacity.

The criteria evaluated to detect scaling events may distinguish between burst workloads (which may return to a lower level) and changes in workload necessitating or causing (e.g., according to the criteria) a scaling event to change the size of the target capacity. For burst workloads, headroom in the allocation of resources to a database may be maintained (e.g., 2 Gigabytes in addition to a targeted capacity of 4 Gigabytes of memory) which can be used to handle the burst workload. However, as a burst workload is expected to be temporary, it may also be expected that the resources obtained to handle the burst workload may be released, either automatically (e.g., memory, network connections) or, as discussed in detail below with regard to FIG. 8, proactively (e.g., to reclaim memory).

If no scaling event is detected, then monitoring of the utilization of computing resources may continue, as indicated by the negative exit from 740. However, if a scaling event is detected for the database instance, as indicated by the positive exit from 730, a modified target capacity may be determined for the computing resource(s) based on the respective utilization of the computing resource(s), in some embodiments, as indicated at 740. For example, the modified target capacity may be set to the median measurement, as discussed above. In some embodiments, a scaling factor may be applied to the respective utilization of the computing resource(s) for scaling up or down to determine the target modified capacity.

As indicated at 750, an amount of the computing resource(s) permitted to be used by the database may be adjusted according to the modified target capacity, in some embodiments. For example, an adjustment to increase or decrease the amount of memory the database can use may be made. An increase may, in some embodiments, allow the database (and related processes for the database, such as a kernel and/or host management as discussed above with regard to FIG. 3) to allocate more memory up to the permitted target capacity. A decrease to the memory may be performed by instructing the database to release the amount of memory. As discussed above with regard to FIGS. 6A and 6B, as well as below with regard to FIG. 8, this released memory may then be freed using a balloon driver technique at a later time.

For other resources, other adjustment techniques may be made (e.g., adding or removing network connections for the database instance, increasing or decreasing processing time for the database instance). For some resources, such as processing resources (e.g., CPUs), scaling may be performed nearly instantaneously and independent of when the determination of the modified target capacity is made. For example, processing resources may be overprovisioned for the database, providing a hard limit for the database. For such computing resources like processing resources, scaling may be permitted on-demand so that processing resource usage can exceed or fall below the target capacity (or modified target capacity) as needed. In this way, target capacity adjustments for some resources (e.g., memory) need not hold up meeting the demands for other computing resources (e.g., CPUs) at the database. In such embodiments, utilization metrics, which may be exposed via various displays or interfaces to a user, may indicate both the points at which target capacities are changed as well as when resource utilization that proceeds independently from target capacities (e.g., CPUs) is above the target capacity (e.g., which may still result in different costs billed to a user corresponding to the utilization above the target capacity, such as a cost determined according to a next capacity unit rate).

Proactive memory reclamation may be implemented in various embodiments in order to support fine-grained virtualization resource provisioning. For example, when query and/or storage engine releases memory obtained for burst usage back to the operating system, this memory may not be automatically freed back to the host system. If not reclaimed proactively, over time, this additional memory could quickly eat up into headroom available for launching new instances on the host system or scaling-up existing instances. In some scenarios, page caches and kernel buffers may gradually allocate memory over time. Since memory could be overprovisioned, in some embodiments, more memory could be used for caching than what is optimal (or needed). Proactive memory reclamation could prevent the waste of memory occurred in such scenarios. Proactive memory reclamation may also improve the ability to accurately identify a burst scenario for a database by keeping the database instance's memory consumption at an optimal usage (so that burst usage in excess of the optimal usage is more identifiable). For instance, excessive page cache may be periodically reclaimed to make sure overall memory usage doesn't grow beyond the database instance's optimal usage. Another form of proactive memory reclamation that may be implemented is to reclaim memory from the engine(s) that was obtained to handle burst workloads.

Figure 8:
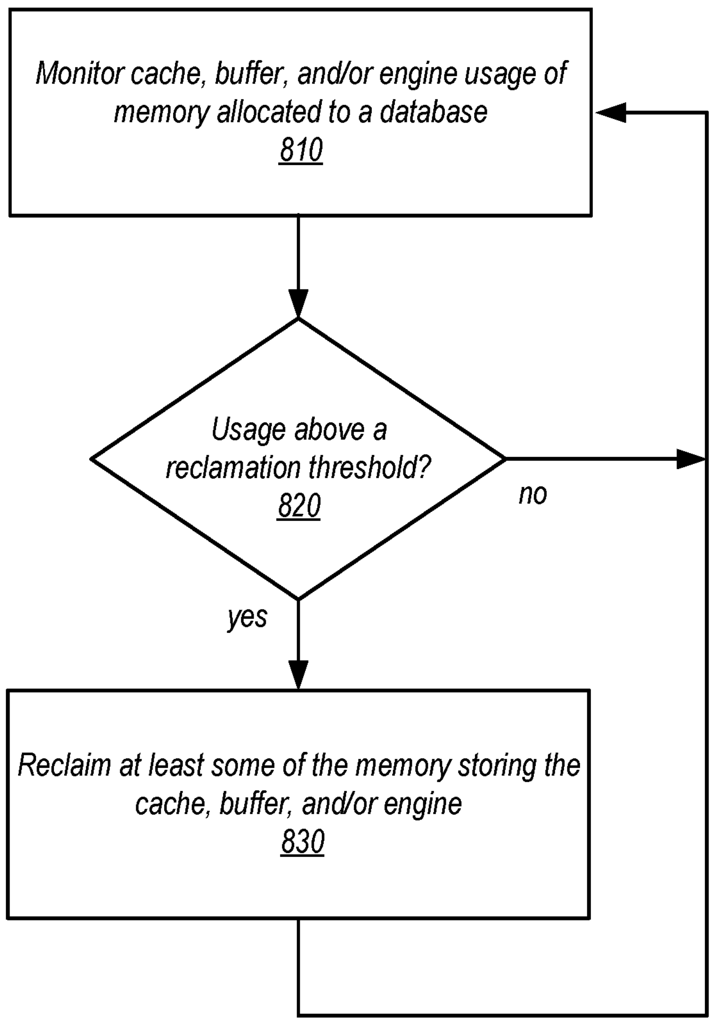
FIG. 8 is a high-level flowchart illustrating various methods and techniques to implement reclaiming buffer/cache memory of a database instance, according to some embodiments.

FIG. 8 is a high-level flowchart illustrating various methods and techniques to implement reclaiming buffer/cache memory of a database instance, according to some embodiments. As indicated at 810, cache (e.g., page cache), buffer (e.g., kernel buffer), and/or engine (e.g., query engine usage) usage of memory allocated to a database may be monitored, in some embodiments. For example, as discussed above with regard to FIG. 5, utilization metrics 532 may include memory utilization information which can be used to determine the memory usage of various features (e.g., cache, buffer, and/or engine). In some embodiments, the utilization may be monitored continuously (or at a very high frequency) in order to quickly perform memory reclamation in those scenarios that are warranted, as discussed above.

As indicated at 820, a determination may be made as to whether the usage is above a reclamation threshold, in some embodiments. For example, different thresholds for different types of usage may be implemented (e.g., a reclamation threshold for cache may be different than the reclamation thresholds for buffer and engine). If the usage is not above the reclamation threshold, then monitoring may continue without taking a reclamation action. If, however, as indicated by the positive exit from 820, then as indicated at 830, at least some of the memory (e.g., storing the cache, buffer, and/or engine) may be reclaimed, in some embodiments. For example, a balloon driver (e.g., as discussed above with regard to FIGS. 6A-6B) or other signal/interface to return, free, or otherwise make available the portion of memory to the host system may be implemented. The amount reclaimed may lower the usage a certain amount below the reclamation threshold in some embodiments (e.g., to the optimal memory usage value for a cache, buffer, and/or engine).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
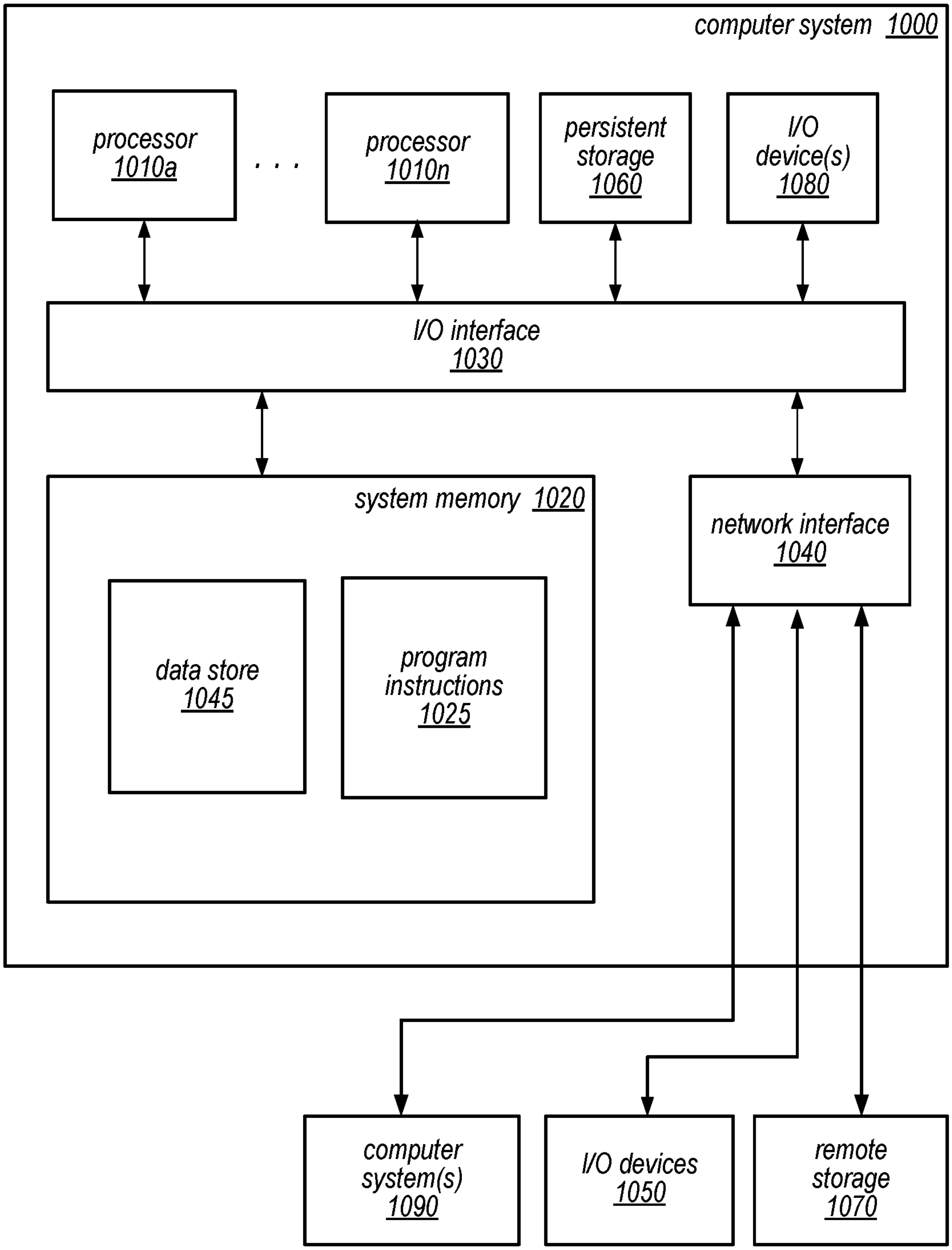
FIG. 9 is a block diagram illustrating an example computer system, according to various embodiments.

FIG. 9 is a block diagram illustrating an example computer system that may implement the techniques for fine-grained virtualization resource provisioning for in-place database scaling, according to various embodiments described herein. For example, computer system 1000 may implement a database engine head node and/or one of a plurality of storage nodes of a separate storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein (e.g., various features of fine-grained virtualization resource provisioning for in-place database scaling). In various embodiments, program instructions 1025 may be encoded in native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor cause the at least one processor to implement a virtualization manager for a plurality of database instances hosted on the system, wherein each of the plurality of database instances having a respective host management and query engine, the virtualization manager configured to:

monitor respective utilization of one or more computing resources by the plurality of database instances, captured within a period of time by respective host management of the plurality of database instances, to detect a scaling event for one database instance of the plurality of database instances according to an evaluation of the respective utilization of the one or more computing resources by the one database instance with respect to a target capacity for the one database instance;

responsive to the detection of the scaling event for the one database instance:

determine, based on the respective utilization of the one or more computing resources by the one database instance, a modified target capacity for the one database instance;

based on the modified target capacity for the one database instance, instruct the host management of the one database instance to perform an adjustment to an amount of the one or more computing resources made available to the system to use for one or more other database instances of the plurality of database instances at the system; and the host management further instructs the query engine of the one database instance to perform the adjustment to at least one of the one or more computing resources.

2. The system of claim 1, wherein the virtualization manager is further configured to:

monitor usage of memory allocated for the one database instance; and responsive to determining that the usage is above a reclamation threshold, instruct the one database instance to cause at least some of the portion of the memory to be reclaimed to make the at least some portion of the memory available to the system.

3. The system of claim 2, wherein to cause the at least some of the portion of the memory to be reclaimed, the one database instance is configured to increase a size of a memory balloon using a balloon driver to cause the at least some portion of the memory to be freed and subsequently decrease the size of the memory balloon using the balloon driver.

4. The system of claim 1, wherein the database instances are implemented as part of a database service offered by a provider network, wherein data for the one database instance is stored in a separate storage service, and wherein the adjustment to the portion of the one or more computing resources made available to the system by the one database instance according to the modified target capacity is made within a minimum capacity and a maximum capacity specified for the one database instance via a request to a control plane of the database service.

5. A method, comprising:

obtaining, at virtualization manager of a multi-tenant host system of a plurality of database instances, wherein each of the plurality of database instances having a respective host management and query engine, respective utilization of one or more computing resources by the plurality of database systems instances on the multi-tenant host system captured within a period of time from respective host management of the plurality of database instances;

evaluating, by the virtualization manager, the respective utilization of the one or more computing resources, captured within the period of time with respect to a target capacity for one database instance of the plurality of database instances, to detect a scaling event for the one database instance;

responsive to detecting the scaling event:

determining, by the virtualization manager based on the respective utilization of the one or more computing resources, a modified target capacity for the one database instance;

based on the modified target capacity for the one database instance, instructing, by the virtualization manager, the host management of the one database instance to adjust an amount of at least one of the one or more computing resources made available to the multi-tenant host system to use for one or more other database instances of the plurality of database instances at the multi-tenant host system; and the host management of the one database instance instructing the query engine of the one database instance to perform the adjustment to at least one of the one or more computing resources.

6. The method of claim 5, wherein the at least one computing resource is memory, wherein a different one of the one or more computing resources is one or more processors, wherein utilization of the one or more processors is permitted to exceed the target capacity before the modified target capacity is determined.

7. The method of claim 5, wherein evaluating the respective utilization of the one or more computing resources captured within the period of time with respect to the target capacity for the one database instance to detect the scaling event for the database comprises making a prediction of an expected resource utilization measurements for a next period of time based on one or more resource utilization measurements obtained within the period of time.

8. The method of claim 5, wherein the adjustment to the amount of the one or more computing resources permitted to be used by the one database instance according to the modified target capacity is made within a minimum capacity and a maximum capacity specified for the one database instance via a request.

9. The method of claim 5, wherein the scaling event is a scale up event and wherein the amount of the one or more computing resources the one database instance is permitted to use is increased.

10. The method of claim 5, further comprising:

monitoring usage of host system memory allocated for the one database instance; and responsive to determining that the usage is above a reclamation threshold, reclaiming at least some of the portion of the memory storing the buffer to make the at least some portion of the memory available to the multi-tenant host system.

11. The method of claim 10, wherein reclaiming the at least some portion of the memory comprises increasing a size of a memory balloon using a balloon driver to cause the at least some of the portion of the memory to be freed and subsequently decreasing the size of the memory balloon using the balloon driver.

12. The method of claim 5, wherein the target capacity and the modified target capacity comprise respective numbers of units that represent a fixed-ratio amount of memory and processor capacity.

13. The method of claim 5, further comprising providing the modified target capacity to a control plane for the multi-tenant host system, wherein the control plane makes placement decisions for new database instances based, at least in part, on the modified target capacity between the multi-tenant host system one or more other multi-tenant host systems.

14. One or more non-transitory, computer-readable storage media, storing program instructions that when executed on or across one or more computing devices cause the one or more computing devices to implement:

receiving, at a virtualization manager of a multi-tenant host system of a plurality of database instances, wherein each of the plurality of database instances having a respective host management and query engine, respective utilization of one or more computing resources by a plurality of database systems on the multi-tenant host system captured within a period of time from respective host management of the plurality of database instances;

evaluating, by the virtualization manager, the respective utilization of the one or more computing resources, captured within the period of time with respect to a target capacity for one database instance of the plurality of database instances, to detect a scaling event for the one database instance;

responsive to detecting the scaling event:

determining, by the virtualization manager based on the respective utilization of the one or more computing resources, a modified target capacity for the one database instance;

based on the modified target capacity for the one database instance, instructing, by the virtualization manager, the host management of the one database instance to adjust an amount of the one or more computing resources made available to the multi-tenant host system to use for one or more other database instances of the plurality of database instances at the multi-tenant host; and the host management of the one database instance instructing the query engine of the one database instance to perform the adjustment to at least one of the one or more computing resources.

15. The one or more non-transitory, computer-readable storage media of claim 14, wherein, in evaluating the respective utilization of the one or more computing resources for the period of time with respect to the target capacity for the database to detect the scaling event for the one database instance, the program instructions cause the one or more computing devices to implement making a prediction of an expected resource utilization measurements for a next period of time based on one or more resource utilization measurements obtained within the period of time.

16. The one or more non-transitory, computer-readable storage media of claim 14, wherein the adjustment to the amount of the one or more computing resources permitted to be used by the one database instance according to the modified target capacity is made within a minimum capacity and a maximum capacity specified for the database via a request.

17. The one or more non-transitory, computer-readable storage media of claim 14, wherein the scaling event is a scale down event and wherein the adjustment to the amount of the one or more computing resources permitted to be used by the one database instance causes the one database instance to release the amount of the one or more computing resources.

18. The one or more non-transitory, computer-readable storage media of claim 14, storing further program instructions that when executed on or across the one or more computing devices, cause the one or more computing devices to further implement:

monitoring usage of a memory allocated for the one database instance; and responsive to determining that the usage is above a reclamation threshold, causing at least some of the portion of the memory storing data for the one database instance to be reclaimed.

19. The one or more or more non-transitory, computer-readable storage media of claim 18, wherein, in causing the at least some portion of the memory to be reclaimed, the program instructions cause the one or more computing devices to implement increasing a size of a memory balloon using a balloon driver to cause the at least some of the portion of the memory to be freed and subsequently decreasing the size of the memory balloon using the balloon driver.

20. The one or more non-transitory, computer-readable storage media of claim 14, wherein the plurality of database instances are hosted as part of a relational database service offered by a provider network.

* * * * *